United States Patent [19]
Kleine et al.

[11] Patent Number: 5,326,199
[45] Date of Patent: Jul. 5, 1994

[54] TOOL BIT AND TOOL BIT CHUCK FOR MANUALLY OPERATED TOOLS

[75] Inventors: Werner Kleine, Achim-Uesen; Reinhard Schulz, Munich, both of Fed. Rep. of Germany

[73] Assignee: Hilti Aktiengesellschaft, Furstentum, Liechtenstein

[21] Appl. No.: 92,343

[22] Filed: Jul. 15, 1993

[30] Foreign Application Priority Data

Jul. 17, 1992 [DE] Fed. Rep. of Germany ....... 4223518

[51] Int. Cl.$^5$ ......................... B23B 45/16; B23B 51/02
[52] U.S. Cl. .................................. 408/226; 279/19.3; 279/19.4
[58] Field of Search ............... 279/19, 19.3–19.5; 408/226

[56] References Cited

U.S. PATENT DOCUMENTS 4,002,347  1/1977  Wanner et al. ................. 279/19.3
4,107,949  8/1978  Wanner et al. ................. 279/75 X

FOREIGN PATENT DOCUMENTS 3843465  6/1990  Fed. Rep. of Germany ...... 408/226

Primary Examiner—Steven C. Bishop
Attorney, Agent, or Firm—Anderson Kill Olick & Oshinsky

[57] ABSTRACT

A tool bit has an axially extending shank section (1) to be inserted into a chuck in a manually-operated tool. The tool bit has an axially extending working section extending from the shank section. In the end region of the shank section remote from the working section there are first faces (2) acting in the axial direction and second faces (3) acting in the circumferential direction. In addition, the shank section (1) has entrainment faces (4a) spaced axially from the first and second faces toward the working section. The entrainment faces (4a) are located radially outwardly from the first and second faces (2, 3). The entrainment faces (4a) are part of grooves formed by a profiled section of the shank section and the grooves are open in the axial direction toward the first and second faces. The entrainment faces (4a) are radially spaced outwardly from the outer surface of the part of the shank section containing the first and second faces, so that they are able to transmit larger torques.

8 Claims, 1 Drawing Sheet

TOOL BIT AND TOOL BIT CHUCK FOR MANUALLY OPERATED TOOLS

BACKGROUND OF THE INVENTION

The present invention is directed to a tool bit to be inserted into a chuck in a manually operated tool used for chisel-cutting and/or percussion drilling. The tool bit has a shank section and a working section with the end region in the shank section remote from the working section containing first and second faces effective in the axial and circumferential directions. In addition, the shank section has radially extending entrainment faces located in a part of the shank section projecting radially outwardly from the outer surface of the shank section containing the first and second faces. The entrainment faces are spaced, relative to the first and second faces, toward the working section of the tool bit.

Known tools of the above type usually have faces acting in circumferential direction for transmitting torque and other faces acting in the axial direction for the axial retention of the tool bit in the chuck of a hand-held or manually operated tool. It is common to locate the faces acting in the circumferential direction in the driving or entrainment grooves which are open towards the free end of the shank section.

The tool bit chuck for the above-mentioned tool bits has a receiving region usually containing entrainment strips forming counterfaces for the faces acting in the circumferential direction. It is conventional for axial retention to provide grooves closed at the ends extending transversely of the axial direction and located in the shank section of the tool bit with radially displaceable locking elements in the chuck for engagement in the closed ended grooves. Accordingly, it is necessary to disengage or shift the locking elements from the grooves in the shank section to remove the tool bit from the chuck. Tool bits as well as a tool bit chuck of this type are known, such as disclosed in DE-PS 25 51 125.

While the faces of the tool bit acting in the axial direction do not have to meet any special requirements, since they are necessary only for retaining the tool bit in the chuck, the faces acting in the circumferential direction have to meet very considerable requirements, because the torque which they transmit may be very high. As a result of the torque to be transmitted, the faces acting in circumferential direction require appropriate generous dimensions. Since the size of the shank section is limited, the dimensions of the faces acting in the circumferential direction are also limited, especially since such dimensions involve a cross-sectional weakening of the shank section. All of these limiting values regarding the dimension of the faces acting in the circumferential direction entail, in view of the torque to be transmitted especially with tool bits having larger diameter in the working region, excessive wear of the faces leading to premature failure of the tool bits.

To afford additional faces effective in the circumferential direction, a tool bit with projections is known from DE-OS 38 43465, with the projections located closer to the working section of the tool bit than the other faces. These projections protruding beyond the diameter of the shank section form entrainment faces cooperating with matching counterfaces on the tool bit chuck known from the above patent publication. These entrainment faces, however, cannot meet the requirements for sufficiently reducing the load acting on the faces effective in the circumferential direction at the occurring high torques. The reason for this is, on one hand, that the entrainment faces protrude directly from the diameter of the shank section, so that the moment to be carried is too small and, on the other hand, that the radial dimension is too small and leads to entrainment faces which are also too small.

SUMMARY OF THE INVENTION

The primary object of the present invention is to provide a tool bit especially capable of transmitting high torque in cooperation with an appropriate tool chuck, whereby the faces on the shank section effective in the circumferential direction are not exposed to excessive wear.

In accordance with the present invention, the least radial dimension between the center of the shank section and the entrainment faces is greater than half the diameter of the shank section containing the axially and circumferentially effective faces.

In accordance with the present invention the entrainment faces are located in an axially extending subsection of the shank section having a diameter exceeding the diameter of the subsection containing the faces effective in the axial and circumferential directions, so that considerably higher torques can be transmitted. There is the particular advantage with tool bits having larger diameter working sections that no additional change in diameter is required, whereby material deformation and material costs can be saved. Moreover, the location of the entrainment faces in accordance with the present invention enables an optimum dimensioning of the tool bit with respect to shock wave aspects.

In a preferred embodiment, the entrainment faces are provided in a profiled section forming grooves open toward the free end of the shank section. With such a profiled section, the manufacture of the tool bits, such as by cold extrusion, enables a simplification of the arrangement of an appropriate tool bit chuck. In addition, there are the handling advantages gained in the insertion of the tool bit into the associated tool bit chuck. The handling and manufacturing advantages are particularly enhanced if the profiled section is in the form of splines. With reference to the manufacturing technology aspects and in view of an optimum dimensioning of the tool bit, preferably the tool bit section is disposed in a subsection of the shank section having a diameter greater than the diameter of the subsection containing the axially and circumferentially effective faces. Suitable dimensioning for such a shank section affords a transition into the working section of the tool bit without the need of additional changes in diameter.

There is the possibility that a tool bit according to the invention can be inserted into a conventional tool bit chuck. This feature assures at least the basic function, that is, of placing the tool bit in operation. In such a case, the advantages gained from the present invention are not attained, so that such a feature affords only an emergency type limited solution if needed for short time use.

The advantages of the present invention, however, are effectively employed, if in the further embodiment of the invention, the tool bit chuck has a receiving region at the chuck opening and another receiving region spaced from the chuck opening with the receiving region spaced from the opening having counterfaces matching and cooperating in the axial direction and in the circumferential direction with the faces on the tool bit and with the receiving region at the chuck opening having matching counterfaces for the entrainment faces of the tool bit where the least radial dimension from the center of the chuck opening to the entrainment faces exceeds half the diameter of the receiving region spaced from the chuck opening.

Accordingly, the step-shaped receiving regions with different cross-sections enable the insertion of conventional tool bits as well as tool bits with entrainment faces according to the present invention. Again the fundamental rule applies that the advantages afforded by the present invention are only fully utilized if a tool bit is employed matched to the tool bit chuck, that is, that the entrainment faces on the tool bit cooperate with corresponding counterfaces in the tool bit chuck. Since the least radial dimension of the matching counterfaces exceeds the radius of the receiving region remote from the chuck opening, sufficiently high torques can be transmitted, whereby effective relief of the matching counterfaces in the receiving region spaced from the chuck opening is assured.

It is advantageous for facilitating the fabrication of the adjoining the chuck opening as well as for handling, particularly when the tool bit is inserted, if the matching counterfaces of the receiving region at the chuck opening are part of a profiled section forming grooves open towards the chuck opening. Accordingly, a spline-like profiled section is advantageous.

The various features of novelty which characterize the invention are pointed out with particularity in the claims annexed to and forming a part of this disclosure. For a better understanding of the invention, its operating advantages attained by its use, reference should be had to the drawing and descriptive matter in which there is illustrated and described a preferred embodiment of the invention.

DETAILED DESCRIPTION OF THE INVENTION

Figure 1:
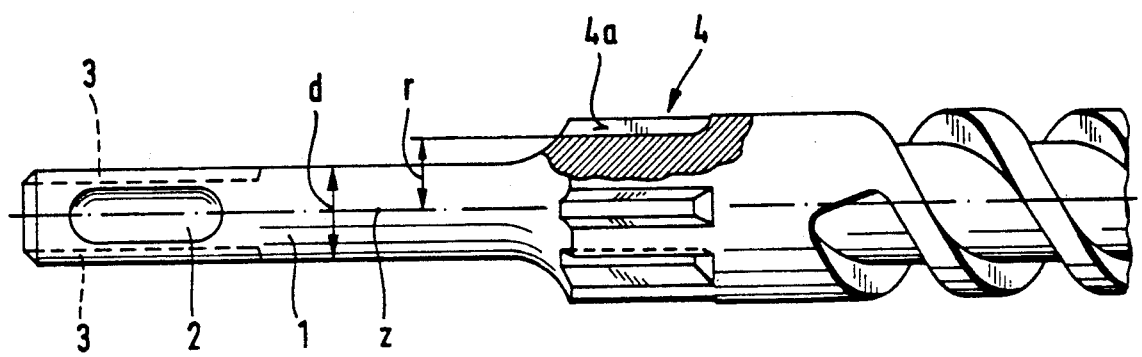
FIG. 1 is an axially extending view of a tool bit including a shank section and a part of a working section, shown partly in section, and embodying the present invention.

In FIG. 1 an axially extending shank section 1 of a tool bit embodying the present invention is shown The shank section is shown in the left-hand portion of FIG. 1 with a part of the working section of the tool bit shown in the right-hand part. The shank section 1 has faces acting or effective in the axial and in the circumferential directions. The faces effective in the axial direction are provided by two axially extending locking grooves 2 closed at the ends of the grooves extending transversely of the axial direction. In addition, the faces effective in the circumferential direction are formed by the radially extending faces of two rotary entrainment grooves 3. The entrainment grooves 3 are open at the free end, that is the left end, of the shank section 1.

Spaced axially from the free end, the shank section 1 has an increased diameter subsection or profiled section 4. The profiled section 4 forms grooves open at the end closer to the free end of the shank section. The profiled section 4 forms radially extending faces spaced in the axial direction from the faces formed by the entrainment grooves 3. The profiled section 4 is designed as splines with essentially radially extending entrainment faces 4a. The least radial dimension r from the center z of the shank section 1 is larger than half the diameter d of the shank section.

Figure 2:
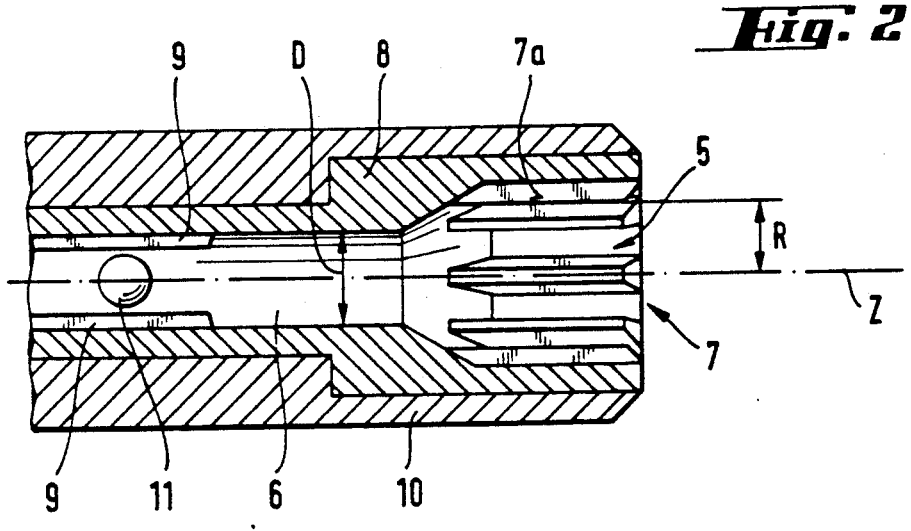
FIG. 2 is a partial axially extending sectional view of a tool bit chuck, shown diagrammatically, for a tool bit as set forth in FIG. 1.

A tool bit chuck is shown diagrammatically in FIG. 2 and comprises an axially extending guidance member 8 and an actuation sleeve 10 laterally enclosing the guidance member. The guidance member 8 has an opening at the right end as viewed in FIG. 2 with a first receiving region 5 extending from the opening into the guidance member followed by a second receiving region 6 extending inwardly from the first receiving region. The second receiving region has matching counterfaces cooperating in axial direction and in circumferential direction with the faces of the tool bit in the smaller diameter subsection of the shank section 1. The matching counterfaces effective in the axial direction are formed by spherically-shaped locking elements 11. The matching counterfaces effective in the circumferential direction are formed by entrainment strips 9 in the second receiving region 6. In the first receiving region 5, extending from the opening into the guidance member 8, there is a spline-like profiled section 7 extending toward the second receiving region with the spaces or grooves between the splines being open at the guidance member opening. Profiled section 7 forms matching counterfaces 7a corresponding with the entrainment faces 4a on the tool bit. In the first receiving region 5 the least radial dimension R of the faces 7a from the center of the guidance member opening is greater than half the diameter D of the second guidance region 6.

By displacing the actuation sleeve 10 either axially or circumferentially, the locking elements 11 can be placed in register with recesses in the actuation sleeve, as known in the art and therefore not shown, so that the locking elements can be shifted out of the second receiving region 6. As a result, the shank section 1 is released and the tool bit can be axially removed from the guidance member 8 of the tool bit chuck.

While a specific embodiment of the invention has been shown and described in detail to illustrate the inventive principles, it will be understood that the invention may be embodied otherwise without departing from said principles.

We claim:

1. Tool bit to be inserted into a chuck in a manually operated tool used for chisel-cutting and/or percussion drilling, the tool bit comprising an axially extending shank section (1) and an axially extending working section, said shank section arranged to be inserted into the chuck and having a first end inserted first into the chuck, said shank section (1) has first faces ( 2 ) acting in the axial direction, second faces (3) acting in the circumferential direction and radially extending entrainment faces (4a) spaced axially from said first and second faces, said shank section (1) has a first axially extending subsection extending from the first end and a second axially extending subsection extending coaxially with and from said first subsection and spaced from the first end, said first subsection has an outer surface with a smaller diameter than an outer surface of said second subsection, said entrainment faces (4a), are formed in the outer surface of said second subsection, said entrainment faces (4a) have a least radial dimension from the axis greater than half the diameter (d) of the first subsection.

2. Tool bit, as set forth in claim 1, wherein said entrainment faces (4a) form part of an axially extending profiled section (4) with said profiled section forming a number of grooves open at the end thereof closer to said free end of said shank section (1).

3. Tool bit, as set forth in claim 2, wherein said profiled section (4) has circumferentially spaced splines defining therebetween said grooves.

4. Tool bit, as set forth in claim 2 or 3, wherein said profiled section is formed in said second subsection of said shank section (1) and said second subsection has a diameter greater than the diameter of the first subsection containing said first and second faces (2, 3).

5. Tool bit, as set forth in claim 4, wherein the diameter of said second subsection is the same as the diameter of the working section of said tool bit.

6. Tool bit and a tool bit chuck for a manually operated tool used for chisel-cutting and/or percussion drilling, the tool bit comprising an axially extending shank section (1) and an axially extending working section, said shank section arranged to be inserted into the chuck and having a first end inserted first into the chuck, said shank section (1) has first faces (2) acting in the axial direction, second faces (3) acting in the circumferential direction and radially extending entrainment faces (4a) spaced axially from said first and second faces, said shank section (1) has a first axially extending subsection extending from the first end and a second axially extending subsection extending coaxially with and from said first subsection and spaced from the first end, said first subsection has an outer surface with a smaller diameter than an outer surface of said second subsection, said entrainment faces are formed in the outer surface of said second subsection, said entrainment faces (4a) have a least radial dimension from the axis greater than half the diameter (d) of the first subsection, said chuck comprising an axially extending guidance member (8), said guidance member (8) having an opening into which said tool bit can be inserted, said guidance member having a first axially extending guidance region (5) extending axially inwardly from said guidance member opening and a second axially extending guidance region extending inwardly from an end of said first guidance region remote from said guidance member opening, said second guidance region (6) comprising matching counterfaces for said first faces (2) and said second faces (3) on said shank section, said first guidance region (5) having counterfaces (7a) in cooperating engagement with said entrainment faces (4a) of the second subsection of said tool bit, with the a radial dimension (R) of said counterfaces in said first guidance region (5) from the axis (C) of the guidance member opening exceeding half the diameter (D) of said second guidance region (6).

7. Tool bit chuck, as set forth in claim 6, wherein said counterfaces (7a) in said first guidance region (5) form part of an axially extending profiled section (7) forming axially extending grooves with said grooves being open at said guidance member opening.

8. Tool bit and tool bit chuck, as set forth in claim 7, wherein said profiled section (7) comprises in the circumferential direction alternating splines and grooves.

* * * * *